United States Patent
Mrzyglod et al.

(10) Patent No.: US 11,543,165 B2
(45) Date of Patent: Jan. 3, 2023

(54) REFRIGERATION APPLIANCE AND METHOD IN WHICH THE ROTATIONAL SPEED OF THE COMPRESSOR IS CONTROLLED BASED ON THE TEMPERATURE OF A FIRST TEMPERATURE ZONE INDEPENDENTLY OF A TEMPERATURE OF OTHER TEMPERATURE ZONES

(71) Applicant: BSH HAUSGERAETE GMBH, Munich (DE)

(72) Inventors: Matthias Mrzyglod, Ulm (DE); Vitali Ulrich, Illertissen (DE); Niels Liengaard, Ulm (DE)

(73) Assignee: BSH Hausgeraete GmbH, Munich (DE)

( * ) Notice: Subject to any disclaimer, the term of this patent is extended or adjusted under 35 U.S.C. 154(b) by 123 days.

(21) Appl. No.: 16/498,432

(22) PCT Filed: Mar. 20, 2018

(86) PCT No.: PCT/EP2018/057014
§ 371 (c)(1),
(2) Date: Sep. 27, 2019

(87) PCT Pub. No.: WO2018/177811
PCT Pub. Date: Oct. 4, 2018

(65) Prior Publication Data
US 2021/0116160 A1    Apr. 22, 2021

(30) Foreign Application Priority Data
Mar. 30, 2017  (DE) .................... 10 2017 205 429.8

(51) Int. Cl.
*F25D 11/02* (2006.01)
*F25B 49/02* (2006.01)
*F25B 5/04* (2006.01)

(52) U.S. Cl.
CPC .............. *F25B 49/022* (2013.01); *F25B 5/04* (2013.01); *F25D 11/022* (2013.01);
(Continued)

(58) Field of Classification Search
CPC ...... F25B 2600/0253; F25B 2600/2513; F25B 5/04; F25B 2313/0234; F25B 2313/0293; F25B 2600/112; F25D 11/022
See application file for complete search history.

(56) References Cited

U.S. PATENT DOCUMENTS 6,775,998 B2 * 8/2004 Yuasa ........................ F25B 5/00
62/197
10,088,215 B2   10/2018 Klingshirn et al.
(Continued)

FOREIGN PATENT DOCUMENTS

CN   102997610 A   3/2013
CN   105276914 A   1/2016
(Continued)

*Primary Examiner* — Jonathan Bradford
(74) *Attorney, Agent, or Firm* — Laurence A. Greenberg; Werner H. Stemer; Ralph E. Locher

(57) ABSTRACT

A refrigeration appliance has at least a first and a second temperature zone and a refrigerant circuit that includes a compressor, a first evaporator for cooling the first temperature zone and a second evaporator for cooling the second temperature zone. The first evaporator is serially connected downstream of the second evaporator in the refrigerant circuit, and a controllable throttle point is arranged upstream of the first evaporator and downstream of the second evaporator in the refrigerant circuit. A compressor controller is
(Continued)

configured to control the rotational speed of the compressor on the basis of the temperature in the first temperature zone.

19 Claims, 2 Drawing Sheets

(52) U.S. Cl.
CPC ............. *F25B 2600/0253* (2013.01); *F25B 2700/2104* (2013.01); *F25D 2700/12* (2013.01)

(56) References Cited

U.S. PATENT DOCUMENTS

| | | | | |
|---|---|---|---|---|
| 2003/0131618 A1* | 7/2003 | Doi | ............... | F25B 49/025 62/180 |
| 2010/0300125 A1* | 12/2010 | Cikanek | ............... | F25B 49/022 62/115 |
| 2012/0102980 A1* | 5/2012 | Benouali | ............... | F25B 41/31 62/56 |
| 2014/0303805 A1* | 10/2014 | Zhou | ............... | F04C 28/08 700/300 |
| 2016/0273816 A1* | 9/2016 | Horiuchi | ............... | F25B 47/025 |
| 2016/0273822 A1 | 9/2016 | Liengaard | | |
| 2017/0061521 A1* | 3/2017 | Lee | ............... | G06F 3/04817 |
| 2018/0187968 A1 | 7/2018 | Liengaard et al. | | |

FOREIGN PATENT DOCUMENTS

| | | |
|---|---|---|
| CN | 105829815 A | 8/2016 |
| DE | 102012211270 A1 | 1/2014 |
| DE | 102013204733 A1 | 9/2014 |
| DE | 102013223737 A1 | 5/2015 |
| DE | 102013226341 A1 | 6/2015 |
| DE | 102015211960 A1 | 12/2016 |
| JP | S51137154 U | 11/1976 |
| WO | 2015074894 A1 | 5/2015 |

* cited by examiner

REFRIGERATION APPLIANCE AND METHOD IN WHICH THE ROTATIONAL SPEED OF THE COMPRESSOR IS CONTROLLED BASED ON THE TEMPERATURE OF A FIRST TEMPERATURE ZONE INDEPENDENTLY OF A TEMPERATURE OF OTHER TEMPERATURE ZONES

BACKGROUND OF THE INVENTION

Field of the Invention

The present invention relates to a refrigeration appliance, in particular a household refrigeration appliance, with multiple temperature zones and a method for the operation of such a refrigeration appliance.

A refrigeration appliance with a first and a second temperature zone is known from DE 10 2013 226 341 A1 in which a refrigerant circuit comprises a compressor, a first evaporator for cooling the first temperature zone and a second evaporator connected in series with the first evaporator for cooling the second temperature zone, and a controllable expansion valve is connected upstream of each evaporator in the refrigerant circuit.

With this known refrigeration appliance, in the case that unsatisfied cooling requirements exist within a temperature zone, the throttling is increased at the controllable expansion valve which is arranged upstream of the evaporator of this temperature zone, so that the evaporation temperature in the respective evaporator falls. In order to prevent this measure also affecting other downstream evaporators in the refrigerant circuit, the throttling in an expansion valve downstream of the respective evaporator is conversely reduced, so that the throttling of the expansion valve connected in series remains unchanged: the mass flow of the refrigerant in the refrigerant circuit thus also remains unchanged overall, so that cooling performance which in this way is additionally available in the respective temperature zone, must be withheld from the other temperature zones. If as a consequence unsatisfied cooling requirements occur in a different temperature zone, the available cooling performance is redistributed once more, which leads to undesirable temperature fluctuations. As a result of the redistribution of the cooling performance it is not possible to take account of changing cooling requirements in all temperature zones, which in practice unavoidably occurs due to temperature changes in the environment of the refrigeration appliance.

It is the task of the invention to develop a refrigeration appliance of the type known from DE 10 2013 226 341 A1 or to create a method for the operation of a refrigeration appliance, which enables simple and stable temperature control of the different temperature zones.

The problem is on the one hand solved in that in the case of a refrigeration appliance with at least one first and one second temperature zone, a refrigerant circuit, which comprises a compressor, a first evaporator for cooling the first temperature zone and a second evaporator for cooling the second temperature zone, wherein the first evaporator is serially connected downstream of the second evaporator in the refrigerant circuit and a first controllable throttle point in the refrigerant circuit is connected upstream of the first evaporator and downstream of the second evaporator, a compressor regulator is designed to control the rotational speed of the compressor on the basis of the temperature of the first temperature zone. As the compressor regulator takes no account of the temperature of temperature zones other than the first, it can be kept very simple. While a change in the rotational speed of the compressor in the first evaporator directly influences the quantity of the vapor siphoned off, and thus the local evaporation rate, the first controllable throttle point has the effect that in the case of the second evaporator upstream of the first evaporator, the change in the volume of refrigerant flowing out is significantly smaller. Although a changed inflow of refrigerant resulting from the change in rotational speed has the effect that over the course of time the amount of liquid refrigerant in the second evaporator changes, the quantity of the liquid refrigerant collected in the second evaporator has no influence on the evaporation rate; for this reason the temperature of the second temperature zone can remain disregarded when controlling the compressor.

In the case of overshooting of a target temperature in the first temperature zone the compressor regulator should increase the rotational speed of the compressor, in order thus to increase the evaporation rate in the first evaporator, while upon undershooting the target temperature it should choke the evaporation rate in the first temperature zone by reducing the rotational speed of the compressor.

As emerges from the foregoing, a change in rotational speed of the compressor is not suitable for rectifying a set point deviation of the temperature in the second temperature zone. For this purpose a throttle regulator can be designed to increase the degree of opening of the first controllable throttle point upon overshooting of a target temperature in the second temperature zone, and to decrease the degree of opening of the first controllable throttle point upon undershooting of the target temperature in the second temperature zone. In that the throttle regulator regulates the outflow from the second evaporator, it influences the rate of evaporation in the second evaporator in the same way as the compressor does for the first evaporator. The following applies here too: an increased or reduced inflow of liquid refrigerant to the first evaporator brought about by opening or narrowing the controllable throttle point has . . . on the the evaporation temperature prevailing there, although it influences the quantity of the liquid refrigerant stored in the first evaporator, it scarcely influences its evaporation conditions.

In exactly the same way as the compressor regulator can disregard the temperature of the second temperature zone when determining the rotational speed of the compressor, the first throttle regulator can ignore the temperature of the first temperature zone while controlling the first throttle point.

The first throttle regulator should be designed to increase the degree of opening of the first controllable throttle point upon overshooting of a target temperature in the second temperature zone and to decrease the degree of opening of the first controllable throttle point upon undershooting of a target temperature in the second temperature zone. If for instance the first throttle regulator increases the degree of opening of the first controllable throttle point, the pressure in the second evaporator then drops, and as a consequence its temperature also falls, so that the second temperature zone is more strongly cooled, as desired; conversely the pressure and temperature of the second evaporator increase if the degree of opening of the first controllable throttle point is increased.

In order to enable rapid adjustment of the degree of opening to changed conditions, the first throttle regulator should be a proportional regulator, preferably a PI controller, that is to say the change in the degree of opening effected by the first regulator should contain a term proportional to the variance between actual and target temperature and preferably also a term proportional to the duration of the variance.

The second temperature zone should have a temperature sensor which is connected to an inlet of the first throttle regulator. No further measured variables are required for control of the first controllable throttle point; that is to say this inlet can be the only inlet of the first throttle regulator receiving a measured variable.

The compressor regulator can be coupled to the first throttle regulator and be designed to increase the rotational speed in the case of an increase in the degree of opening of the first controllable throttle point and to decrease it in the case of a decrease in the degree of opening of the first controllable throttle point. A predictive adjustment of the rotational speed of the compressor is thus already possible at a point when a changed degree of opening of the first controllable throttle point has not yet had an effect on the cooling performance of the first evaporator.

The compressor regulator can also be a proportional or PI controller.

The principle of the invention can be extended to an indeterminate number of evaporators connected in series, in that for instance a third evaporator for regulation of the temperature of a third temperature zone is connected upstream of the second evaporator in the refrigerant circuit via a second controllable throttle point and a second throttle regulator is provided in order to control the degree of opening of the second controllable throttle point on the basis of the temperature of the third temperature zone, independently of the temperature of the second temperature zone.

Of course the compressor regulator can then also be coupled to the second throttle regulator, in order to take account of a change in the degree of opening of the second controllable throttle point when determining the rotational speed of the compressor.

The second throttle regulator for controlling the second throttle point can work totally independently of the first throttle regulator and of the compressor regulator. In practice throttle and compressor regulator can be implemented as software on the same processor; their mutual independence finds expression in the fact that neither accesses the same temperature sensors or makes use of the other's regulator output as input.

A controllable upstream throttle point can be provided between a pressure connection of the compressor and the evaporators. In order to control the distribution of the refrigerant between the evaporators and a high-pressure section of the refrigerant circuit, the degree of opening of this throttle point can be controlled on the basis of a fall in temperature at the first evaporator. In the sense detailed above a distribution regulator used for this purpose can in turn be independent of first, second and possible further regulators.

For an efficient transfer of heat between evaporator and assigned temperature zone a ventilator can be assigned to at least one of the evaporators to drive a stream of air passing across a surface of the evaporator.

In order to control the humidity in the temperature zone, this ventilator can be capable of switching between at least two operating modes with different rotational speeds. One of these modes can be operation with a high rotational speed, which keeps the temperature difference between temperature zone and evaporator small, and accordingly brings about only a minimal dehumidification of the convected air at the evaporator. The relatively high evaporator temperature in this mode enables efficient refrigeration, but because of the high ventilator power does not achieve an ideal level of efficiency. In a second mode the ventilator can be switched off or operated at a lower rotational speed, so that the evaporator reaches low temperatures, which although as a rule are also not ideally energy-efficient, do however bring about powerful dehumidification of the air. In a further mode the ventilator can be operated at a medium rotational speed, in order to optimize the energy efficiency of the appliance.

The problem is further solved by a method for the operation of a refrigeration appliance with at least one first and one second temperature zone, a refrigerant circuit, which comprises a compressor, a first evaporator for cooling the first temperature zone and a second evaporator for cooling the second temperature zone, wherein the first evaporator is serially connected downstream of the second evaporator in the refrigerant circuit and a first controllable throttle point in the refrigerant circuit is connected upstream of the first evaporator and downstream of the second evaporator, in which the temperature of the first temperature zone is measured and the rotational speed of the compressor controlled on the basis of the temperature of the first temperature zone independently of the temperature of the second temperature zone.

A degree of opening of the first controllable throttle point can be controlled on the basis of the measured temperature of the second temperature zone.

Further, in the case of an increase in the degree of opening of the first (or, if present, second) controllable throttle point the rotational speed of the compressor can be increased, and reduced in the case of a reduction in the degree of opening of the same controllable throttle point. Measurement of the temperature of the second temperature zone by the compressor regulator is not required for this purpose; in order to perform the method, the compressor regulator can refer to control signals which the first (or as the case may be, second) throttle regulator transmits to the assigned controllable throttle point.

Further features and advantages of the invention are evident from the description of exemplary embodiments with reference to the attached figures. Wherein:

DESCRIPTION OF THE INVENTION

Figure 1:
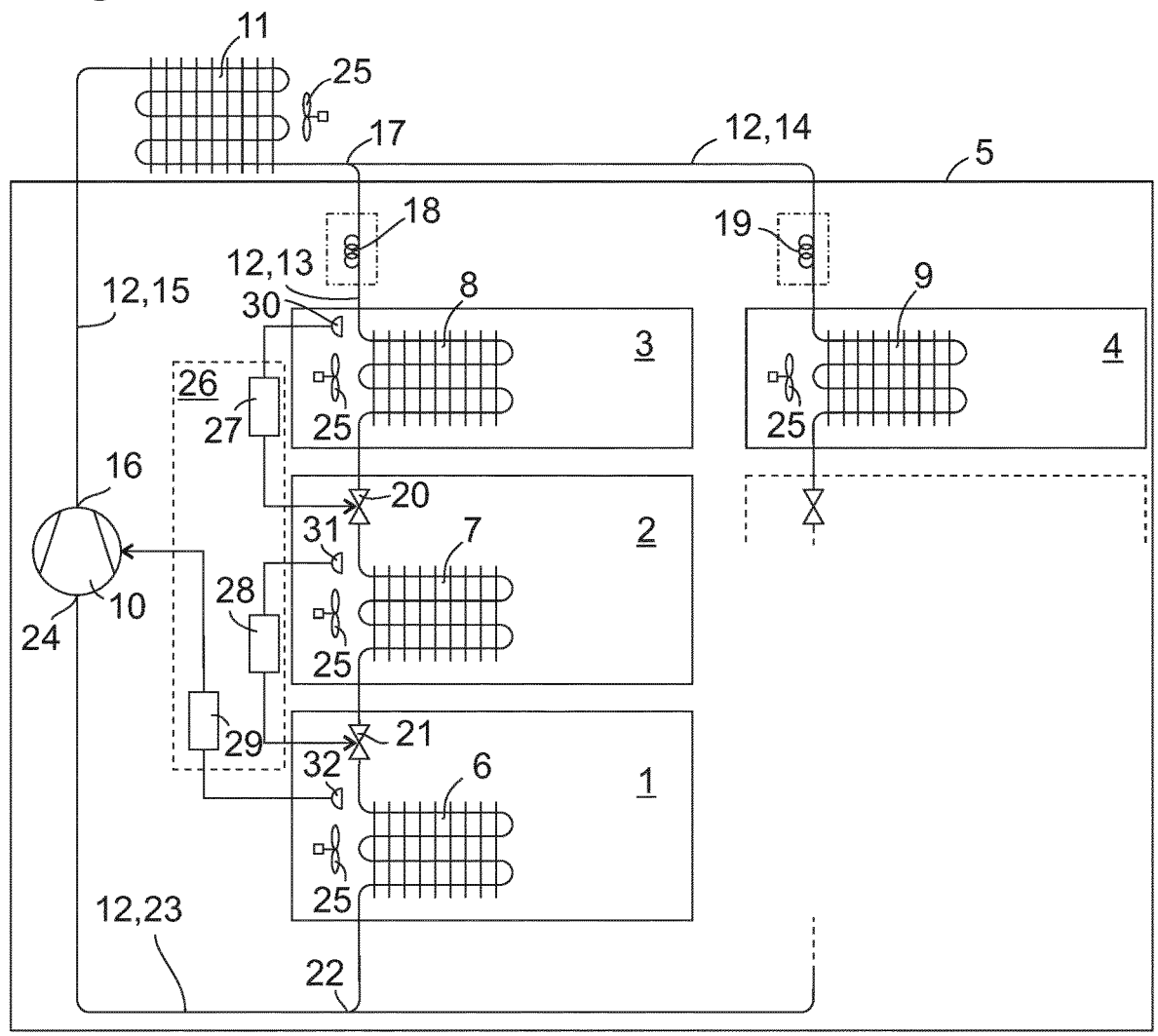
FIG. 1 shows a schematic representation of the inventive refrigeration appliance according to a first embodiment.

FIG. 1 shows in schematic form a refrigeration appliance according to a first embodiment of the invention. The refrigeration appliance is a combination appliance, and comprises a multiplicity of temperature zones 1, 2, 3, 4, typically in the form storage compartments in a housing 5 in each case closable by means of a door and separated from each other by thermally insulating walls.

Each temperature zone 1, 2, 3, 4 has an evaporator 6, 7, 8 or 9 respectively, which are connected in a refrigerant circuit with a compressor 10 and a condenser 11.

At least two evaporators, here the evaporators 6, 7, 8, are connected in series along a branch 13 of a refrigerant line 12; as shown the refrigerant line 12 can further have parallel branches 14 to branch 13, which supply further evaporators, here the evaporator 9.

Each evaporator 6, 7, 8, 9 and the condenser 11 are in each case combined with a ventilator 25 for increasing the heat transfer performance.

In a known manner per se the temperature zones 1, 2, 3, 4 can in each case be divided into a storage compartment and an evaporator chamber accommodating the evaporators 6, 7, 8 or 9, wherein the ventilator 25 then drives the air transfer between storage compartment and evaporator chamber.

The temperature difference that must exist between an evaporator and the storage compartment cooled by it in order to be able to keep the storage compartment at its target temperature is dependent upon the magnitude of the air transfer between storage compartment and evaporator chamber. If this is low, the evaporator temperature must then be low, and as the maintenance of the low evaporator temperature calls for a high level of performance from the compressor 11, the energy efficiency of the appliance is restricted. Water vapor finding its way from the storage compartment into the evaporator chamber is reflected almost completely on the evaporator as a result of the low evaporator temperature, so that the humidity in the storage compartment is low. Conversely, the temperature difference between evaporator and storage compartment can be kept small, if the ventilator 25 ensures a powerful air transfer. The requirements on the performance of the compressor 10 are then reduced, while conversely however more energy is consumed for operation of the fan 25. As a result of the small temperature difference, the level of condensation at the evaporator is low, and a high level of humidity can be maintained in the storage compartment. Between these two extreme cases there is an efficiency-optimized operating mode, in which the performance both of the compressor 10 and also of the ventilator 25 is low, but not minimal, and the sum of their outputs reaches a minimum level. It can be provided for the user to be able to select one of these operating modes for each temperature zone 1, 2, 3 or 4.

A high-pressure section 15 of the refrigerant line 12 extends from a pressure connection 16 of the compressor 10 via the condenser 11 and here a bifurcation 17 to an upstream throttle point 18, 19. The upstream throttle point 18, 19 has an invariable flow resistance. In a known manner per se it is in each case formed by a capillary, which discharges into the evaporator 8 or 9 respectively.

Downstream, the evaporator 8 is followed successively by a controllable throttle point 20, the evaporator 7, a further controllable throttle point 21 and the evaporator 6. As the pressure in the refrigerant line 12 falls after each throttle point 18, 20, 21, zone 3 is the warmest and zone 1 the coldest of temperature zones 1, 2, 3. Zone 3 can thus, for example, take the form of a normal refrigerator compartment, zone 2 a fresh chiller compartment and zone 1 a freezer compartment.

Downstream from the evaporator 6, the branches 13, 14 rejoin each other at a junction 22, and a suction section 23 of the refrigerant line 12 leads to a suction connection 24 of the compressor 10.

A multiplicity of throttle regulators 27, 28 and a compressor regulator 29 are implemented on a microprocessor 26. The regulators 27, 28, 29 are utility programs which share the processing power of the microprocessor 26, but do not access shared data. Each regulator 27, 28, 29 receives and processes measured values from precisely one temperature sensor 30, 31 or 32 respectively.

Figure 2:
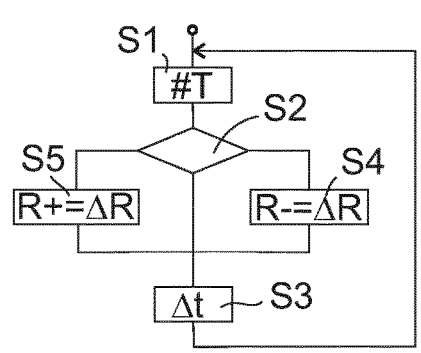
FIG. 2 shows a flowchart of a working method of a throttle regulator of the refrigeration appliance.

FIG. 2 shows a working method of the throttle regulator 27. In step S1 a measured value of the temperature is read from the assigned sensor 30. In step S2 the measured value is compared with a target temperature for the temperature zone 3 predefined by the user. Insofar as the measured value lies within a tolerance range around the target temperature, the method jumps to step S3, in which the elapsing of a time period ∆t is awaited and then reversion to step 51 takes place, in order to repeat the method at regular time intervals.

If it is established in S2 that the measured temperature lies above the tolerance range, there is obviously a need for greater cooling performance in the temperature zone 3. In this case the regulator 27 actuates the throttle point 20 in step S4, in order to decrease its flow resistance by a fixed value ∆R. The magnitude of the decrease can be predefined in a fixed manner or be proportional to the variance between measured temperature and target temperature.

As a result of the decrease in the flow resistance the evaporation temperature in the evaporator 8 falls, and the cooling the temperature zone 3 becomes stronger. At the same time more liquid refrigerant reaches the evaporator 7, without more refrigerant flowing out therefrom, so that over the course of time the pressure there rises and the cooling performance decreases.

If the step S2 is repeated after the waiting period ∆t and the measured temperature continues to lie above the tolerance range, the flow resistance of the throttle point 20 is once more reduced. The flow resistance thus changes proportionally to the integral over time of the control deviation until the cooling requirements of the temperature zone 3 are covered and the temperature measured by the sensor 30 lies within the tolerance range.

Conversely if the measured temperature in step S2 lies below the tolerance range, then in step S5 the throttle regulator increases the flow resistance of throttle point 20 by the value ∆R, so that the temperature of the evaporator 8 rises. The increasing of the flow resistance can be repeated in successive iterations of the method.

Within the framework of the method it is not necessary to take account of the operating mode of the ventilator 25 selected for temperature zone 3; if the user changes the operating mode, this leads initially to a change in the temperature measured by sensor 30 and subsequently, in the course of one or more iterations of the above-described method, to an adjustment of the flow resistance, by means of which the temperature zone 3 once again attains its target temperature.

The working method of the throttle regulator 28 has the same steps as represented in FIG. 2. In step S1 the temperature of the temperature zone 2 or its evaporator 7 is read from the sensor 31; in step S2 it is compared with the set point specified for this temperature zone and depending on the result, the flow resistance of throttle point 21 is either kept unchanged, reduced (S4) or increased (S5). The magnitude ∆R of the change can, but does not have to be identical to that used for the throttle regulator 27. The decrease leads to a fall in pressure and temperature in the evaporator 7 and, to a lesser extent, in the evaporator 8, so that a greater cooling performance is available in both evaporators 7, 8.

If the decrease became necessary, because of the increased cooling requirements of temperature zone 3, the throttle regulator 27 has reduced the flow resistance of throttle point 20 and for this reason the temperature in the evaporator 7 has risen, then the decrease in the flow resistance of the throttle point 21 contributes to the rapid satisfying of the cooling requirements of the temperature zone 3.

Accordingly, in the case of an increase in the flow resistance of throttle point 21 the pressure in the evaporator 7 and to a lesser extent in the evaporator 8, rises.

If in the temperature zone 1 the temperature measured by sensor 32 diverges from the target temperature, there is no throttle point downstream of the evaporator 6 via which the evaporation temperature could be influenced. For this reason the compressor regulator 29 performs a slightly modified method, in which in the case of overshooting of the target temperature in step S4 the rotational speed of the compressor 10 is increased or in the case of undershooting reduced in step S5. As in the case of the throttle regulators 27, 28, S4 results in a reduction in the evaporation temperature in the assigned evaporator 6, but also at the same time to an increase in the mass flow, so that overall more of the cooling performance to be distributed among the different evaporators is available. Conversely S5 increases the evaporation temperature with a simultaneous throttling of the mass flow.

Changed cooling demand thus propagates itself through the refrigeration appliance on a stepwise basis: in the case of increased cooling demand in the temperature zone 3 the satisfying of demand through opening of the throttle point 20 has the result that, after a delay, cooling demand in temperature zone 2 is no longer completely satisfied, an associated correction of the degree of opening of the throttle point 21 leads to heating of the temperature zone 1 and subsequent correction of the rotational speed of the compressor.

Figure 5:
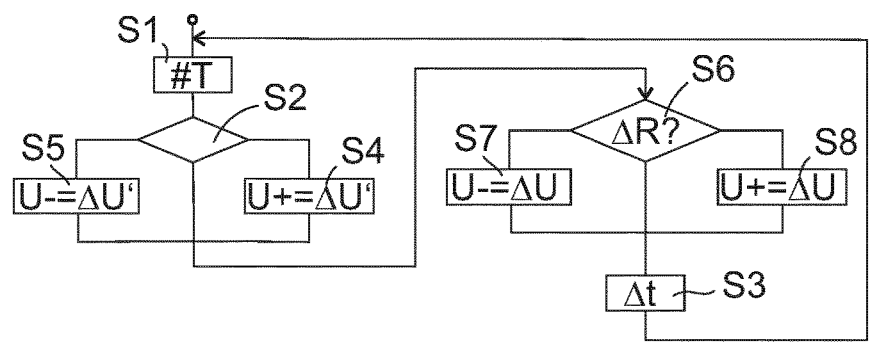
FIG. 5 shows a flowchart of a working method of a compressor regulator.

To speed up the convergence of control, it can be provided for the compressor regulator 29 to be coupled to the throttle regulators 27, 28, in order to receive information from the latter about a change in the flow resistance of the throttle points 20, 21 controlled by them and to update the rotational speed of the compressor 10 according to the change, before the change in the flow resistance has had an effect in the form of a temperature change in the temperature zone 1. The nature of such a coupling can for example be that in each case when one of the regulators 27, 28 increases or decreases the flow resistance by ΔR in step S4, the compressor regulator 29 reduces or increases respectively the rotational speed of the compressor 10 by a corresponding increment ΔU. FIG. 5 shows a working method of the compressor regulator 29 that effects such a coupling. The steps S1-S5 correspond to those from FIG. 2, except for the fact that if in step S2 the measured temperature lies above the set point for temperature zone 1, in step S4 the rotational speed is increased by a fixed value ΔU' or upon undershooting of the set point is reduced by the value ΔU' in S5. In each iteration of the method in step S6 a check is performed as to whether, since the preceding iteration, at least one of the throttle regulators 27, 28 has effected a change ΔR in the flow resistance at its controllable throttle point 20 or 21. In the case of an increase by ΔR, the rotational speed is reduced by ΔU (S7), in the case of a decrease, increased by ΔU (S8). The value of ΔU can be different depending upon whether the change in the flow resistance takes place at throttle point 20 or 21.

Figure 3:
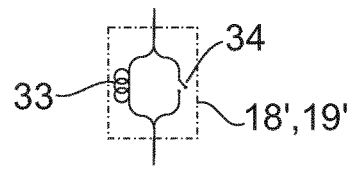
FIG. 3 shows a modified detail of the refrigeration appliance.

According to a modified embodiment the capillaries at the throttle points 18, 19 from FIG. 1 are replaced by controllable throttle points 18',19'. These controllable throttle points 18',19' can be expansion valves of the same type as at throttle points 20, 21, though they can also be, as shown in FIG. 3, a parallel circuit made up of a capillary 33 and a shut-off valve 34. While for instance through opening of the shut-off valve 34, the flow resistance of throttle point 18' is rendered negligibly low, the pressure in the evaporator 8 can be adjusted to that of the condenser 11, so that refrigerant in the evaporator 8 condenses instead of evaporating, and the temperature zone 3 is heated by the heat released there.

In this case too, the regulators 28, 29 continue to work according to the method described in connection with FIG. 2, in order to distribute the available cooling performance to the temperature zones 1, 2 as required.

Figure 4:
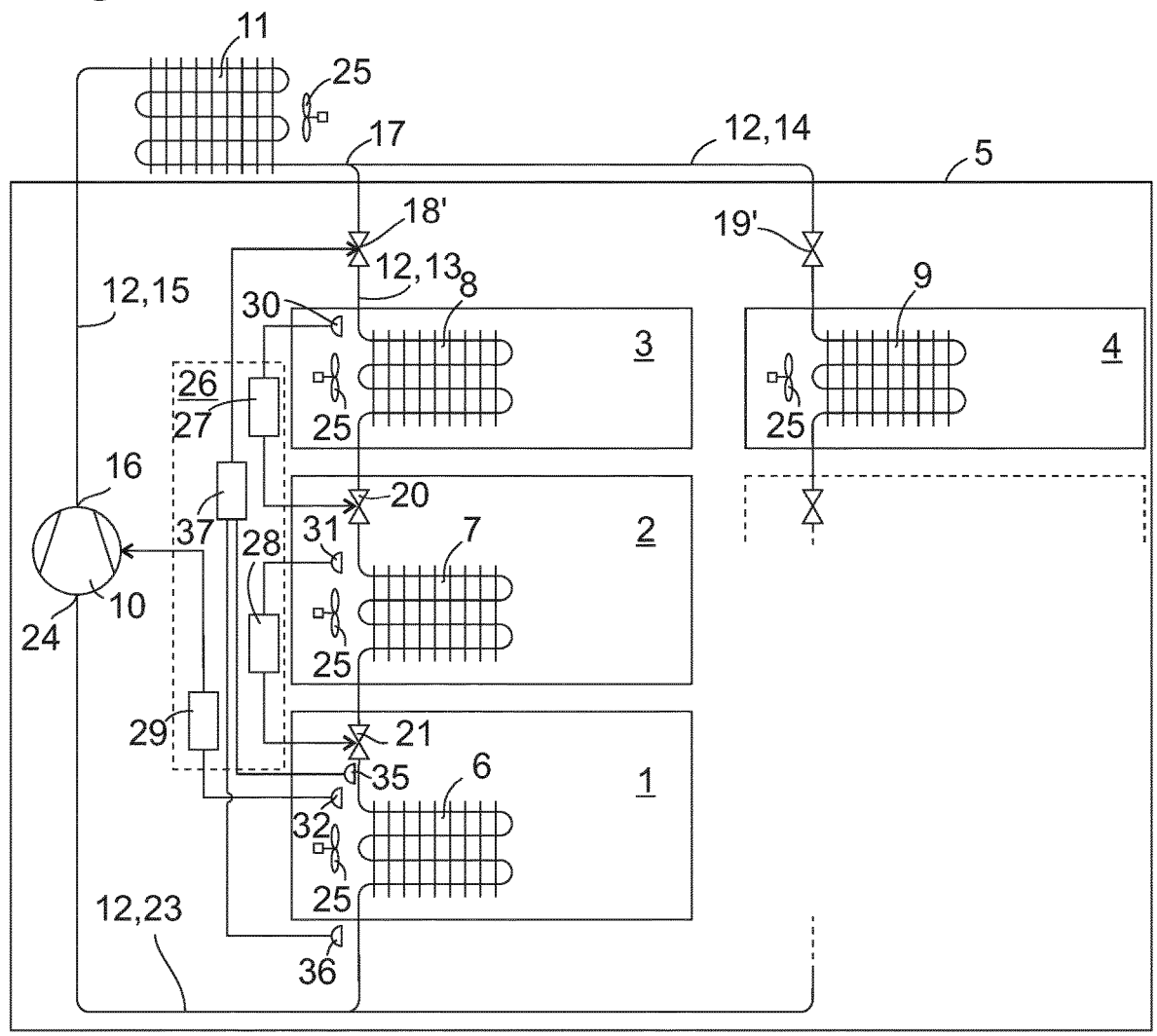
FIG. 4 shows a representation analogous to FIG. 1 according to a second embodiment.

FIG. 4 shows a diagram of a refrigeration appliance analogous to FIG. 1 according to a developed embodiment of the invention. Identical reference characters in both figures designate components already described in connection with FIG. 1; what was stated in the description of FIG. 1 about these components applies here too, and does not need to be repeated. An additional temperature sensor 35 mounted adjacent to the injection point of the evaporator 6, in order to record its evaporation temperature with certainty even if the charging with liquid refrigerant is insufficient to keep it at the evaporation temperature over its whole extent. The temperature sensor 35 can also serve to control a defrost heater for defrosting of the evaporator 6. A further temperature sensor 36 is arranged on an outlet of the evaporator 6 or on the suction section 23, in order to record the temperature of the refrigerant vapor flowing back to the compressor 10. A further regulator 37 is connected to both temperature sensors 35, 36, in order to monitor the difference of the temperatures and to control the flow resistance of an expansion valve, which is inserted as a controllable throttle point 18' between the condenser 11 and the evaporator 8, on the basis of this difference. If the difference is too small, this indicates a high filling level of the evaporator 6 and the possibility that, as a result of overfilling, liquid refrigerant is encroaching into the suction section 23. If this is the case, the regulator 37 increases the flow resistance of the throttle point 18', so that liquid refrigerant increasingly accumulates ahead of the throttle point 18' and conversely the quantity of the refrigerant in the evaporator 6 falls. If, on the other hand, the difference is too great, that is to say if the temperature of the siphoned-off refrigerant vapor measured by the sensor 35 is only a little lower than the compartment temperature of temperature zone 1, this then indicates insufficient charging of the evaporator 6, and the flow resistance of the throttle point 18' is reduced, in order to allow more liquid refrigerant to penetrate as far as the evaporator 6 via the evaporators 8, 7.

REFERENCE CHARACTERS

1 Temperature zone
2 Temperature zone
3 Temperature zone
4 Temperature zone
5 Housing
6 Evaporator
7 Evaporator
8 Evaporator
9 Evaporator
10 Compressor
11 Condenser
12 Refrigerant line
13 Branch
14 Branch
15 High-pressure section
16 Pressure connection
17 Bifurcation
18 Throttle point
19 Throttle point 20 Throttle point
21 Throttle point
22 Junction
23 Suction section
24 Suction connection
25 Ventilator
26 Microprocessor
27 Throttle regulator
28 Throttle regulator
29 Compressor regulator
30 Temperature sensor
31 Temperature sensor
32 Temperature sensor
33 Capillary
34 Shut-off valve
35 Temperature sensor
36 Temperature sensor
37 Regulator

The invention claimed is:

1. A refrigeration appliance, comprising:
   temperature zones including at least one first temperature zone and at least one second temperature zone;
   a refrigerant circuit, containing:
      a compressor;
      a first evaporator for cooling said first temperature zone; and
      a second evaporator for cooling said second temperature zone, said first evaporator serially connected with said second evaporator and connected in said refrigerant circuit downstream of said second evaporator;
   a first controllable throttle point disposed in said refrigerant circuit and connected upstream of said first evaporator and downstream of said second evaporator; and
   a processor;
   said processor implementing a compressor regulator configured to control a rotational speed of said compressor, during operation of said compressor, on a basis of a temperature of said first temperature zone independently of a temperature of other temperature zones; and
   said processor implementing a first throttle regulator configured to control a degree of opening of said first controllable throttle point based on a temperature of said second temperature zone.

2. The refrigeration appliance according to claim 1, wherein said compressor regulator is configured to increase the rotational speed of said compressor from a nonzero rotational speed upon overshooting of a target temperature in said first temperature zone and to decrease the rotational speed of said compressor to a nonzero rotational speed upon undershooting of the target temperature in said first temperature zone, said compressor regulator being implemented by said processor.

3. The refrigeration appliance according to claim 1, wherein said first throttle regulator is configured to increase the degree of opening of said first controllable throttle point upon overshooting of a target temperature in said second temperature zone and to decrease the degree of opening of said first controllable throttle point upon undershooting of the target temperature in said second temperature zone.

4. The refrigeration appliance according to claim 1, wherein said first throttle regulator is a proportional—integral controller.

5. The refrigeration appliance according to claim 1, wherein:
   said second temperature zone has a temperature sensor;
   said first throttle regulator has an inlet connected to said temperature sensor of said second temperature zone.

6. The refrigeration appliance according to claim 1, wherein said compressor regulator is coupled to said first throttle regulator and is configured to increase the rotational speed of said compressor in a case of an increase in the degree of opening of said first controllable throttle point and to decrease the rotational speed of said compressor in the case of a reduction in the degree of opening of said first controllable throttle point.

7. The refrigeration appliance according to claim 1, wherein said compressor regulator is a proportional—integral controller.

8. The refrigeration appliance according to claim 1,
   wherein said temperature zones include at least one third zone;
   further comprising a second controllable throttle point;
   further comprising a second throttle regulator implemented by said processor; and
   wherein said refrigerant circuit has a third evaporator to regulate a temperature of said third temperature zone, said third evaporator is connected upstream of said second evaporator in said refrigerant circuit via said second controllable throttle point and that said second throttle regulator controls a degree of opening of said second controllable throttle point on a basis of a temperature of said third temperature zone.

9. The refrigeration appliance according to claim 1,
   wherein said compressor has a pressure connection; and
   further comprising an upstream controllable throttle point disposed between said pressure connection of said compressor and said first and second evaporators in said refrigerant circuit, wherein and a degree of opening of said upstream controllable throttle point is controlled in response to a decrease in temperature at said first evaporator.

10. The refrigeration appliance according to claim 1, further comprising a ventilator to drive a stream of air passing across a surface of at least one of said first and second evaporators and is assigned to at least one of said first and second evaporators.

11. The refrigeration appliance according to claim 10, wherein said ventilator can be switched between operating modes with different rotational speeds.

12. A method for operating a refrigeration appliance containing at least one first and one second temperature zone and a refrigerant circuit having a compressor, a first evaporator for cooling the first temperature zone and a second evaporator for cooling the second temperature zone, wherein the first evaporator is serially connected with said second evaporator and is connected downstream of the second evaporator in the refrigerant circuit, and a first controllable throttle point in the refrigerant circuit is connected upstream of the first evaporator and downstream of the second evaporator, which comprises the steps of:
   measuring a temperature of the first temperature zone; and
   controlling a rotational speed of the compressor, during operation of the compressor, on a basis of the temperature of the first temperature zone independently of a temperature of other temperature zones;
   measuring the temperature of the second temperature zone; and controlling a degree of opening of the first controllable throttle point based on the temperature of the second temperature zone.

13. The method according to claim 12, which further comprises:
increasing the rotational speed of the compressor, from a nonzero rotational speed, in a case of an increase in the degree of opening of the first controllable throttle point; and
reducing the rotational speed of the compressor to a nonzero rotational speed, in a case of a reduction in the degree of opening of the first controllable throttle point.

14. The method according to claim 12, wherein the step of controlling the rotational speed of the compressor includes increasing the rotational speed of the compressor from a first nonzero speed to a second nonzero speed that is higher than the first nonzero speed on the basis of the temperature of the first temperature zone independently of the temperature of the other temperature zones.

15. The method according to claim 12, wherein the step of controlling the rotational speed of the compressor includes reducing the rotational speed of the compressor from a first nonzero speed to a second nonzero speed that is lower than the first nonzero speed on the basis of the temperature of the first temperature zone independently of the temperature of the other temperature zones.

16. The method according to claim 12, which comprises: providing only one refrigerant flow path enabling communication with said first evaporator, wherein the only one refrigerant flow path includes the first controllable throttle point.

17. The refrigeration appliance according to claim 1, wherein said compressor regulator is configured to control the rotational speed of the compressor by increasing the rotational speed of the compressor from a first nonzero speed to a second nonzero speed that is higher than the first nonzero speed on the basis of the temperature of the first temperature zone independently of the temperature of the other temperature zones.

18. The refrigeration appliance according to claim 1, wherein said compressor regulator is configured to control the rotational speed of the compressor by reducing the rotational speed of the compressor from a first nonzero speed to a second nonzero speed that is lower than the first nonzero speed on the basis of the temperature of the first temperature zone independently of the temperature of the other temperature zones.

19. The refrigeration appliance according to claim 1, comprising only one refrigerant flow path enabling communication with said first evaporator, wherein said only one refrigerant flow path includes said first controllable throttle point.

* * * * *